US007222494B2

(12) United States Patent
Peterson et al.

(10) Patent No.: US 7,222,494 B2
(45) Date of Patent: May 29, 2007

(54) ADAPTIVE INTELLIGENT CIRCULATION CONTROL METHODS AND SYSTEMS

(75) Inventors: Mark W. Peterson, Annandale, MN (US); Robert J. Schnell, Plymouth, MN (US); Brent D. Vick, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 303 days.

(21) Appl. No.: 10/753,589

(22) Filed: Jan. 7, 2004

(65) Prior Publication Data

US 2005/0144963 A1 Jul. 7, 2005

(51) Int. Cl.
*F25D 17/00* (2006.01)
*G05D 23/32* (2006.01)
*G05F 1/40* (2006.01)

(52) U.S. Cl. ............................ 62/178; 62/158; 323/282

(58) Field of Classification Search ................. 62/178, 62/158, 159, 230; 361/22, 33; 323/282
See application file for complete search history.

(56) References Cited

U.S. PATENT DOCUMENTS

| | | | |
|---|---|---|---|
| 2,495,861 | A | 1/1950 | Newton |
| 2,882,383 | A | 4/1959 | Boyd Jr. et al. |
| 3,454,078 | A | 7/1969 | Elwart |
| 3,635,044 | A | 1/1972 | Heth |
| 3,948,438 | A | 4/1976 | Vlasak |
| 4,011,735 | A | 3/1977 | Martz et al. |
| 4,075,864 | A | 2/1978 | Schrader |
| 4,136,822 | A | 1/1979 | Felter |
| 4,267,967 | A | 5/1981 | Beck et al. |
| 4,356,962 | A | 11/1982 | Levine |
| 4,369,916 | A | 1/1983 | Abbey |
| 4,408,711 | A | 10/1983 | Levine |
| 4,452,391 | A | 6/1984 | Chow |
| 4,467,617 | A | 8/1984 | Morgan, Jr. et al. |
| 4,502,625 | A | 3/1985 | Mueller |
| 4,571,950 | A | 2/1986 | Nariai et al. |
| 4,595,139 | A | 6/1986 | Levine |
| 4,684,060 | A | 8/1987 | Adams et al. |
| 4,718,021 | A | 1/1988 | Timblin |
| 4,773,587 | A | 9/1988 | Lipman |

(Continued)

FOREIGN PATENT DOCUMENTS

| | | | |
|---|---|---|---|
| JP | 2000039200 A | * | 2/2000 |
| JP | 2000234786 A | * | 8/2000 |

OTHER PUBLICATIONS

Honeywell Inc., "Residential Ventilation Control," EPRI Research Project 2034-44, May 1993.

(Continued)

*Primary Examiner*—Chen Wen Jiang

(57) ABSTRACT

Adaptive intelligent circulation control methods and systems are used to help increase the comfort and/or reduce energy usage and equipment wear. In one illustrative embodiment, the circulation and/or ventilation time is adjusted based on one or more environmental conditions inside or outside the building structure. In another illustrative embodiment, the circulation and/or ventilation time may be adjusted based on the current time of day, current time of year, and/or the current schedule period. In another illustrative embodiment, the circulation and/or ventilation time is randomized over time. The start time, end time, and/or length of a circulation and/or ventilation cycle may be randomly set.

4 Claims, 12 Drawing Sheets

U.S. PATENT DOCUMENTS

| | | | |
|---|---|---|---|
| 4,776,385 A | 10/1988 | Dean | |
| 4,838,482 A | 6/1989 | Vogelzang | |
| 4,930,460 A | 6/1990 | Aihara et al. | |
| 4,941,325 A | 7/1990 | Nuding | |
| 4,951,473 A | 8/1990 | Levine et al. | |
| 5,020,332 A | 6/1991 | Nakatsuno et al. | |
| 5,131,236 A | 7/1992 | Wruck et al. | |
| 5,142,880 A | 9/1992 | Bellis | |
| 5,179,524 A | 1/1993 | Parker et al. | |
| 5,239,834 A | 8/1993 | Travers | |
| 5,241,253 A | 8/1993 | Schlagen | |
| 5,282,770 A | 2/1994 | Shibata | |
| 5,325,286 A | 6/1994 | Weng et al. | |
| 5,415,617 A | 5/1995 | Kraus | |
| 5,433,377 A | 7/1995 | Sodo et al. | |
| 5,492,273 A | 2/1996 | Shah | |
| 5,547,017 A | 8/1996 | Rudd | |
| 5,579,993 A | 12/1996 | Ahmed et al. | |
| 5,707,005 A | 1/1998 | Kettler et al. | |
| 5,727,887 A | 3/1998 | Webster et al. | |
| 5,742,516 A | 4/1998 | Olcerst | |
| 5,791,408 A | 8/1998 | Seem | |
| 5,862,982 A | 1/1999 | Federspiel | |
| 5,881,806 A | 3/1999 | Rudd | |
| 5,884,806 A | 3/1999 | Boyer et al. | |
| 5,971,846 A | 10/1999 | Cho et al. | |
| 6,079,627 A | 6/2000 | Kettler | |
| 5,547,017 A | 11/2000 | Rudd | |
| 6,161,764 A | 12/2000 | Jatnicks | |
| 6,170,271 B1 | 1/2001 | Sullivan | |
| 6,179,627 B1 | 1/2001 | Daly et al. | |
| 6,318,639 B1 | 11/2001 | Toth | |
| 6,415,617 B1 | 7/2002 | Seem | |
| 6,431,268 B1 | 8/2002 | Rudd | |
| 6,467,695 B1 | 10/2002 | Riley et al. | |
| 6,514,138 B2 | 2/2003 | Estepp | |
| 2002/0072322 A1 | 6/2002 | Sharp et al. | |
| 2002/0090908 A1 | 7/2002 | Estepp | |
| 2003/0146289 A1 | 8/2003 | Sekhar et al. | |
| 2004/0222307 A1 | 11/2004 | DeLuca | |

OTHER PUBLICATIONS

Honeywell Inc., "Field Demonstration of a Residential Ventilation Controller," EPRI Research Project 3512-04, Final Report, Mar. 1995.

Nutech Energy Systems Inc., "Lifebreath Clean Air Furnace "Electric" Clean Air Furnace Manual Model 60ELE" pp. 1-18, downloaded Feb. 5, 2004.

http://content.honeywell.com/yourhome/ptc-thermostats/PC8900faq.htm, Honeywell, Your Home Expert—Programmable Thermostats: FAQ, 10 pages, printed Feb. 4, 2004.

Honeywell, "Perfect Climate Comfort Center," Quick Guide, 6 pages, 1996.

http://www.aricycler.com/frv.html, "AriCycler—The Indoor Air Quality Solution," 2 pages, printed Feb. 4, 2004.

http://www.aircycler.com/instfrv.htm, "AirCycler FR-V Installation," 2 pages, printed Feb. 4, 2004.

http://www.aircycler.com/instfrv.htm, "FR—Installation," 3 pages, printed Feb. 4, 2004.

Ashrae Standard, "Ventilation and Acceptable Indoor Air Quality in Low-Rise Residential Buildings," BSR/ASRAE Standard 62.2P, Fourth Public Review, Nov. 2002.

Lipidex Corporation, "AirCycler, Improving Indoor Air Quality," 23 pages, printed Sep. 8, 2003.

Aprilaire, Choose a better ventilation solution for today's tight homes, Ventilation Control System Model 8126, 6 pages, 2003.

Lifebreath, "Current Events Fall Edition," 4 pages, Sep. 1999.

Nutech Energy Systems Inc., "Programmable ventilation Controller 99-105," Operation and Installation Manual, 6 pages, downloaded Feb. 4, 2004.

Honeywell Inc., "Perfect Climate Comfort Center," Owners Guide, 44 pages, 1998.

Aprilaire, "Ventilation Controller," Model 8120 Ventilation Controller, Owner's Manual, 2 pages, downloaded Feb. 4, 2004.

Nutech Energy Systems Inc., "Operating Your Ventilation Dehumidistat," Operating the 99-250 Ventilation Dehumidistat, 2 pages, downloaded Feb. 4, 2004.

Honeywell Inc., "Residential Ventilation Control," Project Report, 32 pages, May 1993.

* cited by examiner

ADAPTIVE INTELLIGENT CIRCULATION CONTROL METHODS AND SYSTEMS

FIELD

The present invention is related to the field of heating, ventilation, and air conditioning (HVAC) systems. More particularly, the present invention is related to control methods for HVAC systems.

BACKGROUND

HVAC systems are commonly used to control various environmental conditions within building structures including, for example, temperature, humidity, ventilation, etc. In doing so, a fan or the like is often used to force air through the HVAC system and provide conditioned air to the inside space of the building structure. When doing so, the air is circulated within the structure. Air circulation can help increase the comfort inside the building structure by, for example, equalizing the temperature, humidity and other environmental conditions within the structure.

Some HVAC systems have one or more circulation modes. For example, some HVAC systems include a fan "on" mode, where the fan is "on" continuously, regardless of whether the HVAC system is called to condition the air in the building structure. A "circulate" fan mode is also sometimes provided, which typically runs the fan for a fixed period of time during each hour, such as 20 minutes each hour. These and other circulation modes may help circulate the air within a building structure.

In some HVAC systems, fresh air ventilation is also provided. Fresh air ventilation has become increasingly popular, especially because new building structures have become more energy efficient and consequently more air tight. Fresh air ventilation is typically used to replace stale air inside the building structure with fresh outside air. Fresh air ventilation often uses the fan of the HVAC system, and thus also provides air circulation within the building structure. Heat exchangers are sometimes used to exchange heat between the outgoing stale air and the incoming fresh outside air to help reduce the energy costs associated with heating or cooling building structure.

While circulation and/or ventilation are often desirable, over-circulation and/or over-ventilation can result in increased energy costs and excessive equipment wear. What would be desirable, therefore, are adaptive circulation and/or ventilation control methods and systems that provide desired circulation and/or ventilation levels, while minimizing energy costs and equipment wear.

SUMMARY

The present invention relates to adaptive circulation and/or ventilation control methods and systems for providing controlled circulation and/or ventilation levels in a building structure. In one illustrative embodiment, the circulation and/or ventilation time is adjusted based on one or more environmental conditions inside or outside the building structure. For example, the HVAC system may include one or more sensors for sensing one or more environmental conditions in and/or around the building structure. The one or more sensors may include, for example, one or more temperature sensors, humidity sensors, air quality sensors, gas sensors, or any other suitable sensors, as desired. HVAC system settings such as set point values, system mode (e.g. heat, cool or off), whether the building is expected to be occupied or unoccupied, time of day, time of year, etc. may also be used in some embodiments. Based on the output(s) of the sensors, and in some cases the system settings, the HVAC system may adjust the circulation and/or ventilation time accordingly.

In another illustrative embodiment, the circulation and/or ventilation time may be randomized over time. For example, in some illustrative embodiments, the start time, the end time, and/or the length of the circulation and/or ventilation cycle may be randomly set. This may provide a number of advantages including, for example, increased comfort, reduced power spiking in HVAC systems that have multiple equipment installations, etc.

DETAILED DESCRIPTION

The following detailed description should be read with reference to the drawings. The drawings, which are not necessarily to scale, depict illustrative embodiments and are not intended to limit the scope of the invention.

Figure 1:
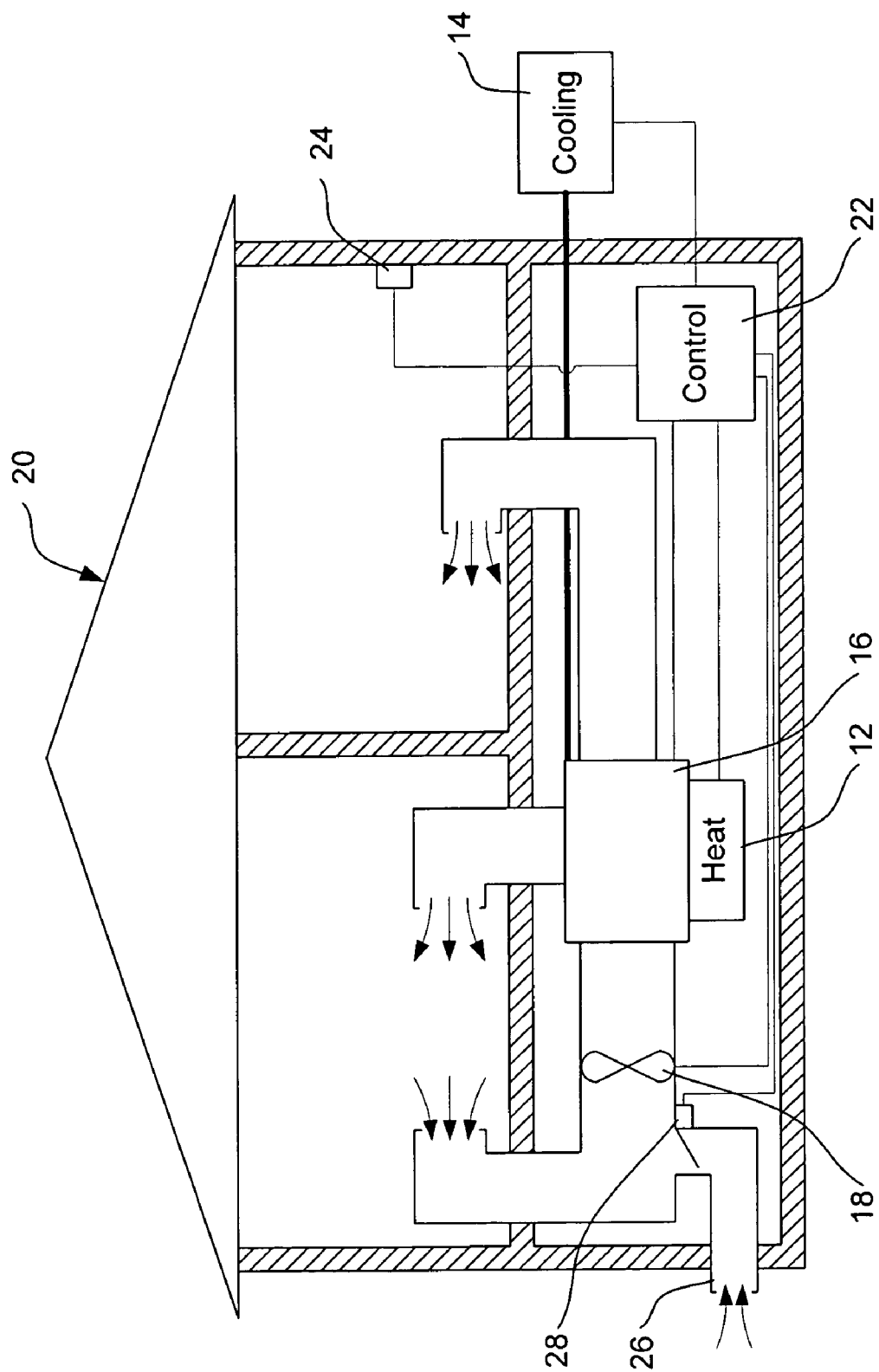
FIG. 1 is a schematic diagram of an illustrative HVAC system.

FIG. 1 is a schematic diagram of an illustrative HVAC system. The illustrative HVAC system is used for controlling one or more environmental conditions of an inside space of a structure 20. The illustrative HVAC system includes a heating apparatus 12, a cooling apparatus 14, a heat exchanger 16, and a circulation/ventilation fan 18. The HVAC system creates air circulation in the structure 20 using the fan 18 and ductwork. Also shown is a controller 22 that receives environmental information and user inputs from a thermostat 24, which may also include a humidistat. Additional sensors may be placed in and around the structure 20 for sensing both internal and external conditions.

As an optional feature, and for some HVAC systems, a fresh air vent 26 and damper 28 may be included to enable fresh air ventilation into the structure 20. The fresh air vent 26 and damper 28 allow constant, selective or intermittent infusion of fresh air from outside the structure 20, as desired. While the methods and systems of the present invention may be used for HVAC systems that include fresh air ventilation, it is not required in all embodiments.

Typically, a user will input information such as a set point temperature and/or a schedule of set point temperatures, humidity levels, circulation rates, etc, into the controller 22. The controller 22 may receive information through any suitable device, such as the controller shown in FIGS. 2A–2C. Occupancy may also be monitored by the controller 22 either by the use of sensors such as motion sensors, by receiving user-input occupancy information, by derivation from a controller schedule, or through any other suitable mechanism. For systems incorporating fresh air ventilation, inputs regarding desired fresh air ventilation levels may also be provided to the controller 22 in any suitable manner. The controller 22 may periodically call for heating, cooling, humidity control, circulation, and/or fresh air ventilation, and activate the appropriate components 12, 14, 18, 28.

Figure 2A:
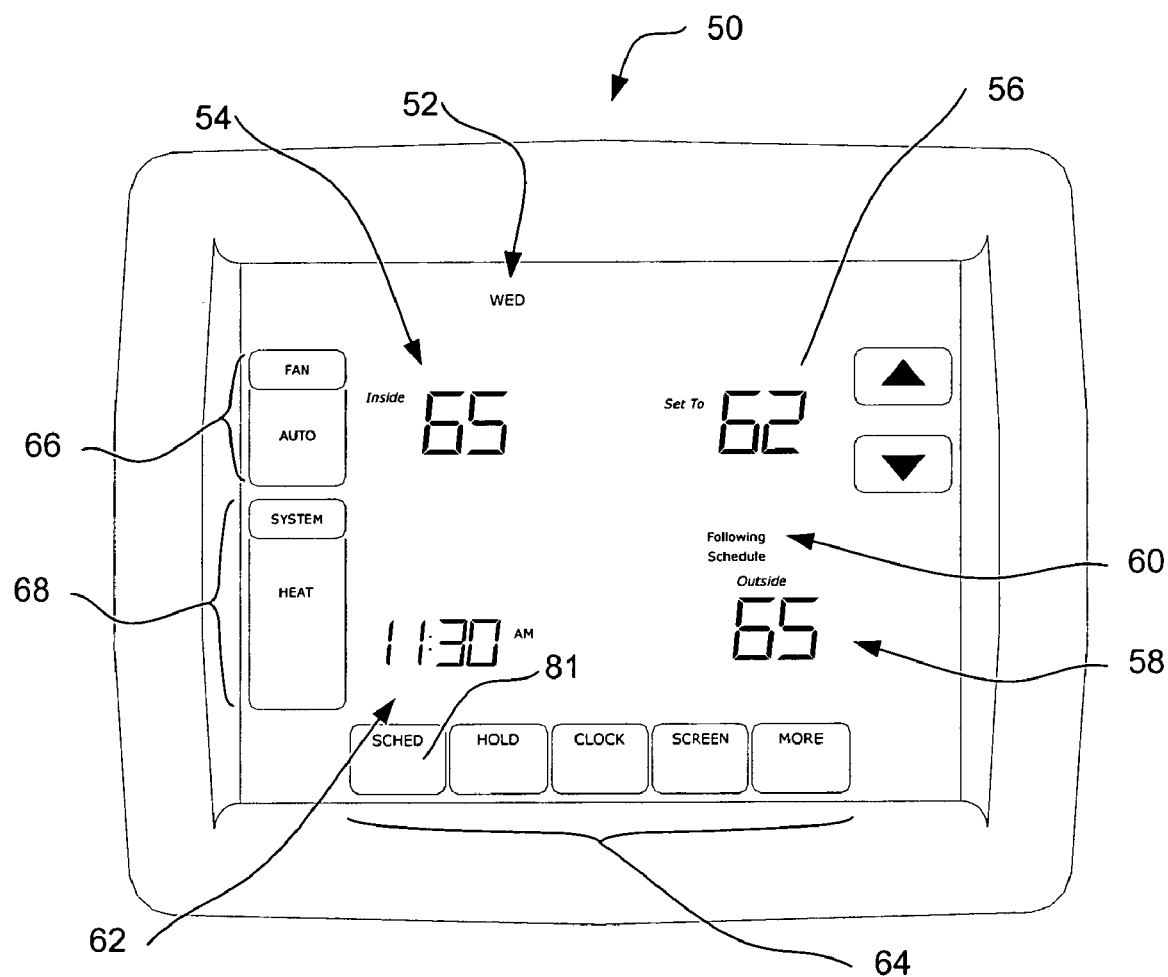
FIGS. 2A–2C show illustrative user interfaces for the controller of the HVAC system of FIG. 1.
Figure 2B:
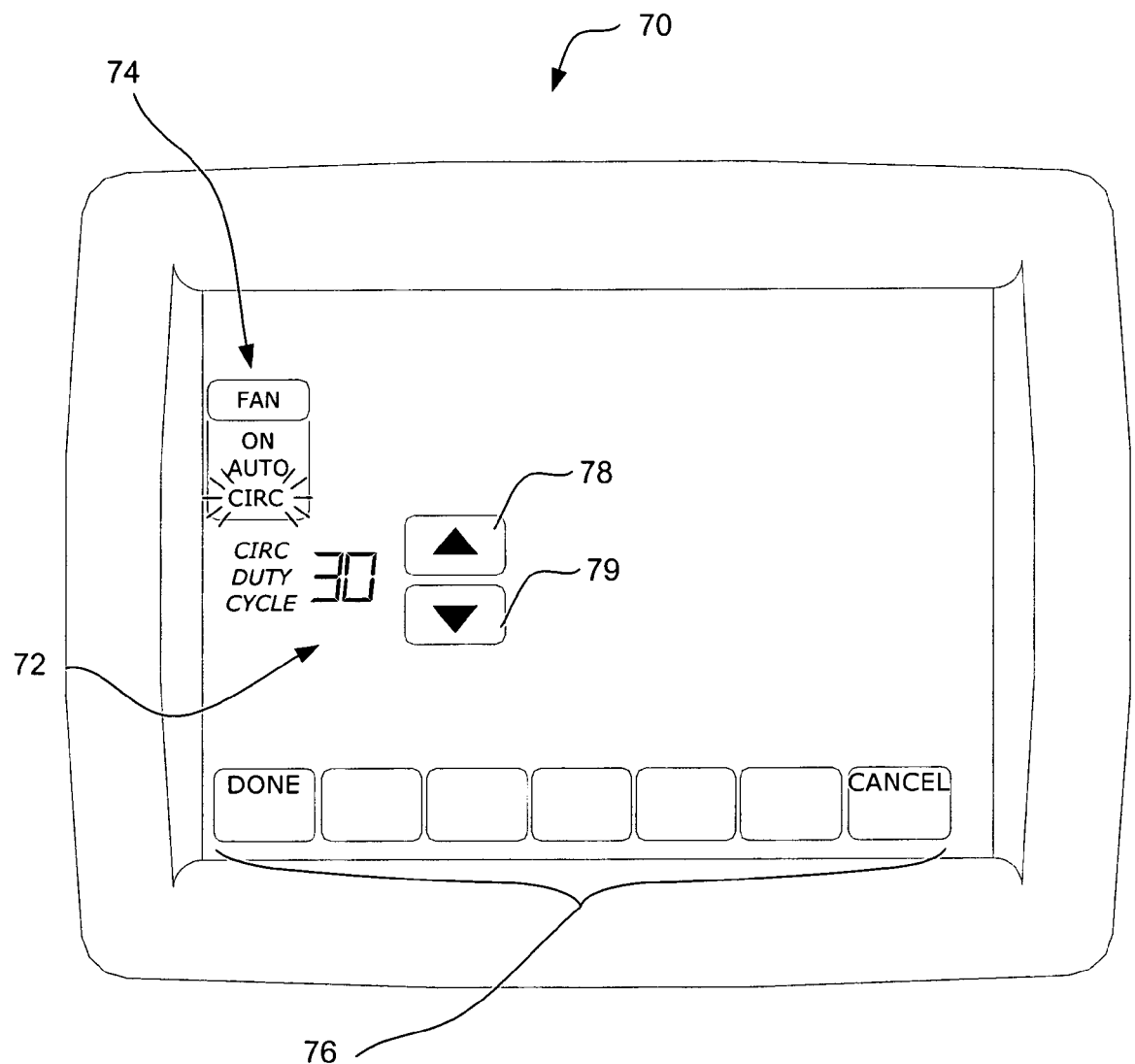
Figure 2C:
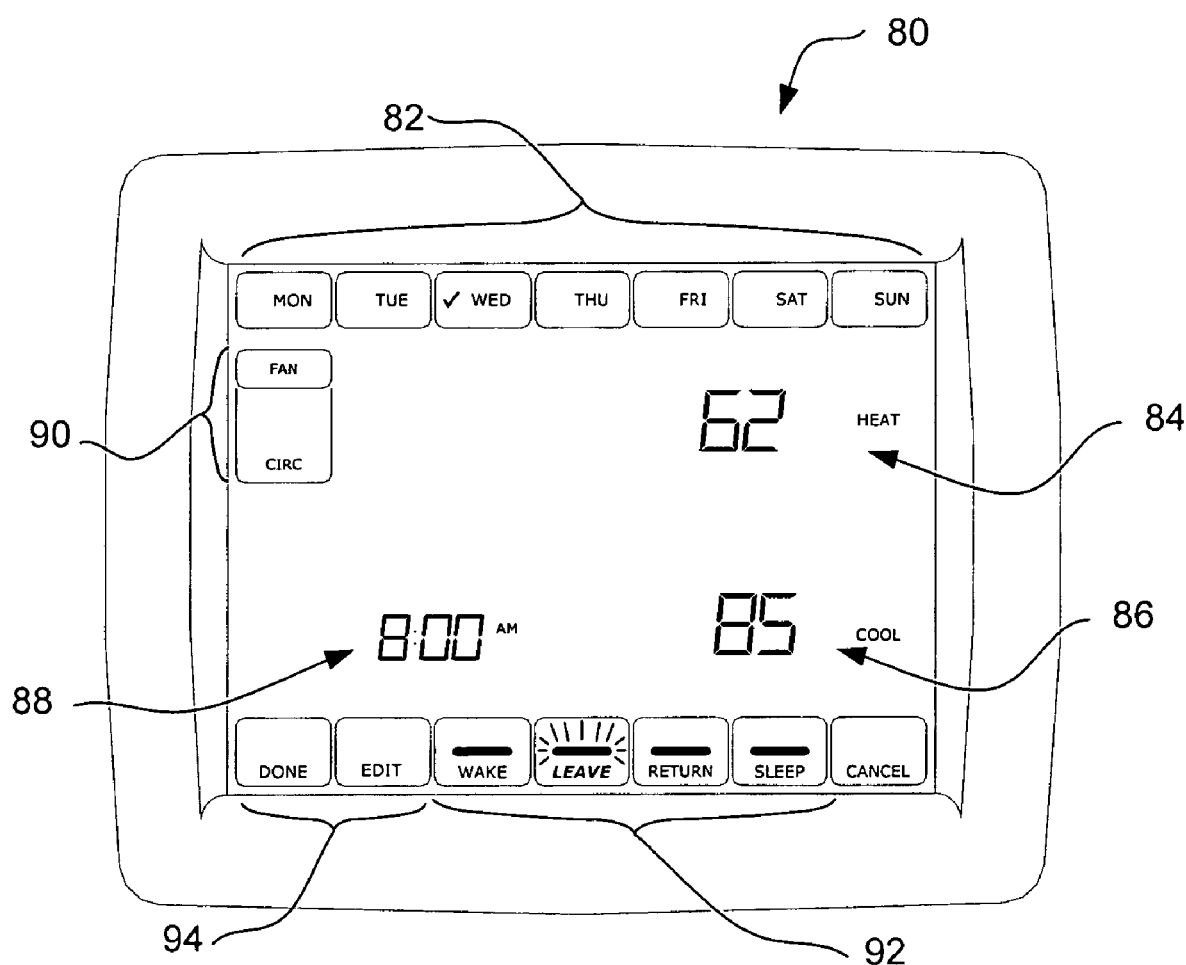

FIGS. 2A–2C show illustrative user interfaces for the controller of the HVAC system of FIG. 1. The user interfaces shown in FIGS. 2A–2C include a touchpad having "touch-key" areas where a user can make selections using virtual or soft "buttons". The user interfaces shown in FIGS. 2A–2C are only illustrative, and other controllers with other displays and/or selection mechanisms may be used, if desired.

FIG. 2A shows a first user interface 50 which includes a day indicator 52, an inside temperature indicator 54, a set point indicator 56, and an outside temperature indicator 58. The temperature indicators 54 and 58 relay information gathered by inside and outside temperature sensors, respectively. The day indicator 52 indicates the current day of the week, typically based on an internal or external clock, which also may enable a daily or weekly schedule. The controller status is shown at 60, where it is indicated that a preprogrammed schedule is currently being followed. The user interface 50 also indicates the current time of day 62.

The lower portion of the user interface 50 includes several virtual or soft "buttons" generally shown at 64. In the illustrative user interface 50, the virtual or soft "buttons" 64 can be used to change the mode of the controller (the controller is shown having schedule and hold modes), to access clock information, to change screen options, and/or to access further options. The user interface 50 also includes a fan status indicator, which may include a virtual or soft "button" 66. When the virtual or soft "button" 66 is depressed, and as further described below with respect to FIG. 2B, the user may select a particular fan mode. In the illustrative embodiment, the available fan modes include, for example, a fan "on" mode, a fan "auto" mode and a fan "circulate" mode.

The illustrative user interface 50 of FIG. 2A may further include a system mode indicator 68, which includes a virtual or soft "button" 68 for changing the system mode. In FIG. 2A, the system mode is set to heat, as shown at 68. However, other modes may include, for example, a cool mode, an auto mode, and an off. Other modes may also be provided, as desired.

FIG. 2B shows an illustrative user interface 70 which may be displayed after the virtual or soft "button" 66 of the fan status indicator of FIG. 2A has been depressed. The illustrative user interface 70 displays a fan mode selector 74, which allows the user to select a desired fan mode. As described above, the available fan modes may include, for example, a fan "on" mode, a fan "auto" mode and a fan "circulate" mode. In the fan "on" mode, the fan of the HVAC system may be "on" continuously, regardless of whether the HVAC system is making a call (e.g. heat, cool) to condition the air in the building structure. In the "auto" mode, the fan may run during the HVAC system calls that are necessary to meet the desired HVAC schedule. In the "circulate" mode, the fan may run according to the adaptive circulation and/or ventilation control methods, as further described herein. In some embodiments, the adaptive circulation and/or ventilation control methods of the present invention may be included in the fan "auto" mode, if desired. It should be recognized that these fan "modes" are only illustrative, and they are not intended to limit the scope of the present invention.

In some embodiments, a circulation duty cycle (CDC) indicator 72 may also be provided to allow the user to enter a desired circulation duty cycle index, which may correspond to the amount of circulation desired by the user. In the illustrative embodiment, the index is set to "30". A value of "30" may correspond to, for example, an initial or starting value for the circulation duty cycle of 30 percent. As further described below, the initial or starting value for the circulation duty cycle may be changed by the adaptive circulation and/or ventilation control methods of the present invention. In the illustrative embodiment, the up arrow 78 and the down arrow 79 may be used to increase or decrease, respectively, the desired circulation duty cycle index. As generally shown at 76, the user interface 70 may also include virtual or soft "buttons" labeled "DONE" and "CANCEL", which may allow the user to exit the user interface 70 and return to the user interface 50 shown in FIG. 2A.

In another embodiment, rather than having the user enter an index that corresponds to, for example, a particular percentage, other manners of data input may be chosen. For example, the user may, for example, have a dial or other scale having positions from one to ten, where the user can select a level within the range defined by the scale. Higher numbers may indicate a higher circulation level, while lower numbers may indicate a lower circulation level. Alternatively, the user may be provided with an option to select, for example, LESS, NORMAL, or MORE circulation. In yet another embodiment, with the system operating the user may modify operation by selecting to have MORE or LESS circulation than that which is already occurring. That is, the user may be provided with options of MORE or LESS, relative to the then existing circulation conditions.

FIG. 2C illustrates another user interface 80, which may be displayed when the "SCHED" button 81 of FIG. 2A is depressed. The user interface 80 includes day indicators 82, a heating set point indicator 84, a cooling set point indicator 86, a time indicator 88, a fan mode selector/indicator 90, period selectors/indicators 92, and edit control keys 94. The user interface 80 may be used to edit the schedule of the controller 22 (see FIG. 1). In the illustrative embodiment, each day includes four periods including a "wake" period, a "leave" period, a "return" period and a "sleep" period. These periods are only illustrative. Each period may be assigned a different set point, and in the illustrative embodiment, a different fan mode, if desired. In FIG. 2C, the heat set point 84, the cool set point 86, the fan mode 90, as well as the beginning time 88, are displayed for the "leave" period of the Wednesday schedule. With such a schedule, the controller 22 (see FIG. 1) may expect the building structure to be unoccupied during the "Leave" period, and occupied during the other periods.

Figure 3:
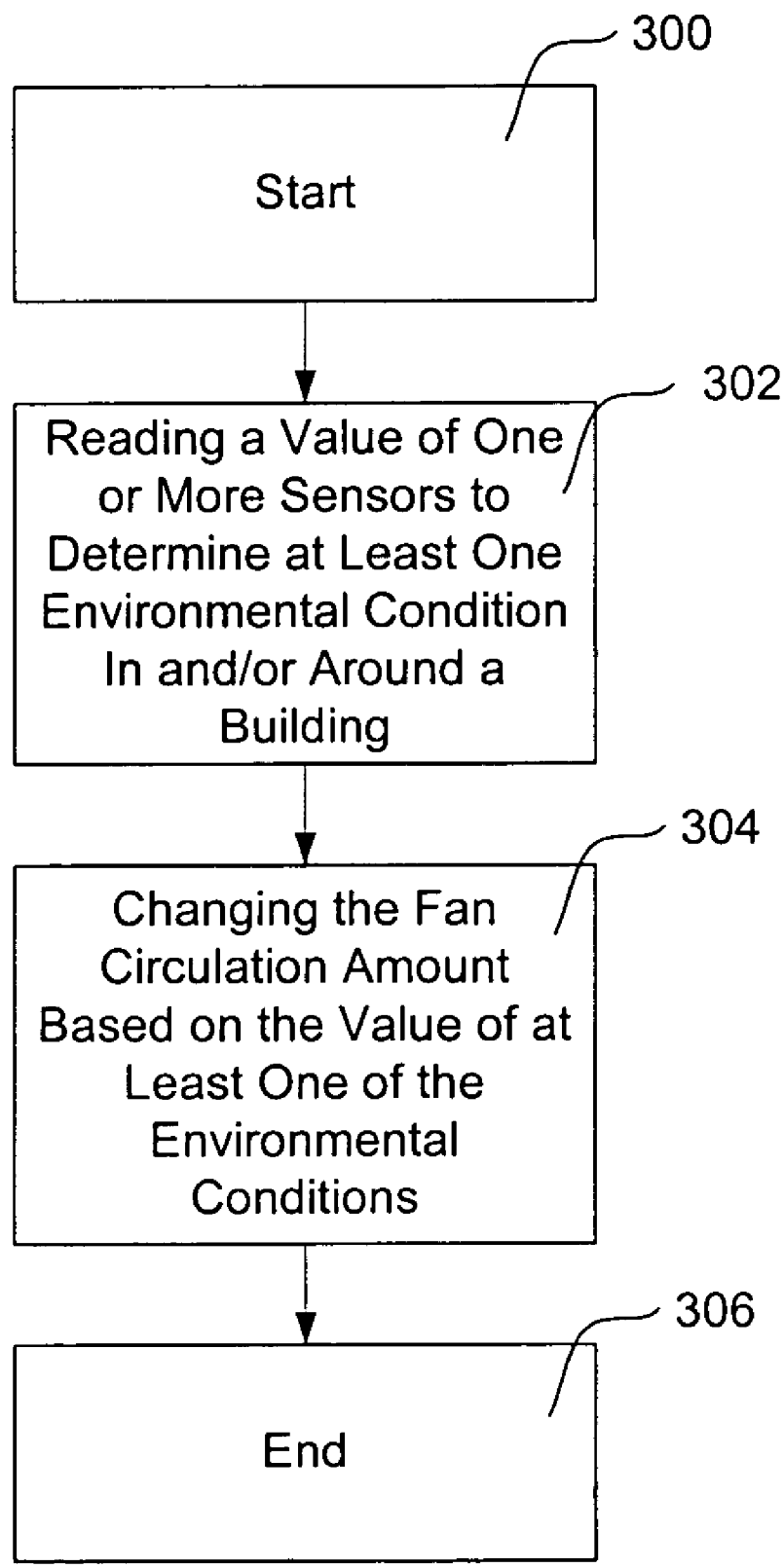
FIG. 3 shows a flow chart of one illustrative method in accordance with the present invention.

FIG. 3 shows a flow chart of one illustrative method in accordance with the present invention. The flow chart is entered at start block 300. Control is then passed to block 302. Block 302 reads a value of one or more sensors to determine at least one environmental condition in and/or around a building. The one or more sensors may include, for example, one or more temperature sensors, humidity sensors, air quality sensors, gas sensors, or any other suitable sensors, as desired. The environmental conditions may include, for example, inside temperature, outside temperature, inside humidity, outside humidity, inside air quality, outside air quality, occupancy of the inside space, or any other desired environmental condition as desired. It is contemplated that the sensors used to detect the one or more environmental conditions may be wired or wireless device. In some embodiments, for example, the sensors may provide sensor data via a communications system such as a phone line and/or the Internet. For example, air quality data may be collected by one or more sensors at an airport or the like, and the sensor data may be retrieved across a phone line or the internet, if desired. Also, for sensors within the building structure, the sensors may provide sensor data to a controller via one or more wires, a bus, or via a wireless (e.g. RF) connection.

In some embodiments, some HVAC system settings may also be read, such as set point values, system mode (e.g. heat, cool or off), whether the building is expected to be occupied or unoccupied, time of day, time of year, etc. Control is then passed to block 304. Block 304 changes the fan circulation amount or level based on at least one of the environmental conditions sensed in block 302, and in some cases, on one or more of the HVAC system settings.

In one illustrative example, when the outside temperature is warm, the fan circulation amount (in some cases including ventilation) may be increased to increase the cooling effect often felt by occupants caused by moving air, and/or to help de-stratify the air to get a more even temperature distribution in the inside space. In another illustrative example, when the inside humidity is low, the fan circulation amount (in some cases including ventilation) may be increased to provide more air through a humidifier of the HVAC system. In another illustrative example, when the HVAC system is in a heating mode, and the set point is low, the fan circulation amount (in some cases including ventilation) may be reduced to help reduce the cooling effect often felt by occupants caused by moving air. In yet another example, when the HVAC system is in a cooling mode, and the set point is high, the fan circulation amount (in some cases including ventilation) may be increased to increase the cooling effect often felt by occupants caused by moving air.

In yet another example, when the HVAC system is in a heating mode, and the outside temperature is closer to the set point temperature thus reducing the load on the HVAC system, the fan circulation amount (in some cases including ventilation) may be increased to increase the number of times that the air passes through the air cleaner of the HVAC system. This may be desirable because when the outside air temperature is closer to the set point temperature, the amount of time that the HVAC system will be run to satisfy the heat load may be less. Likewise, when in a heating mode and the inside temperature is more than the set point, the HVAC system will run less, and the fan circulation amount (in some cases including ventilation) may be increased to increase the number of times that the air passes through the air cleaner of the HVAC system and/or to help de-stratify the air to get a more even temperature distribution in the inside space.

Also, when in a cooling mode, and the inside temperature is less than the set point, the HVAC system will tend to run less and the fan circulation amount (in some cases including ventilation) may be increased to increase the number of times that the air passes through the air cleaner of the HVAC system and/or to help de-stratify the air to get a more even temperature distribution in the inside space.

In yet another example, when in a heating mode, and when the outdoor humidity is relatively low, the fan circulation amount (including ventilation) may be reduced to help reduce the amount of dry air that is brought inside. Likewise, when in a cooling mode, and when the outdoor humidity is relatively high, the fan circulation amount (including ventilation) may be reduced to help reduce the amount of humid air that is brought inside.

In yet another example, if the indoor air quality is poor, the fan circulation amount (including ventilation) may be increased to increase the number of times that the air passes through the air cleaner of the HVAC system. Likewise, if the outdoor air quality is poor, the fan circulation amount (with ventilation) may be decreased to decrease the amount of outside air that is brought into the inside space, or increased (without ventilation) to increase the amount of air that passes through the HVAC filter.

These are just a few examples of adaptively controlling the circulation and/or ventilation time based on one or more environmental conditions in and/or around the building structure, and in some cases, one or more system settings of the HVAC system. Once the desired circulation level has been changed by block 304, the illustrative method may be exited, as shown at 306. In some cases, the method may be repeated constantly or periodically to control the circulation level within a building structure.

Figure 4:
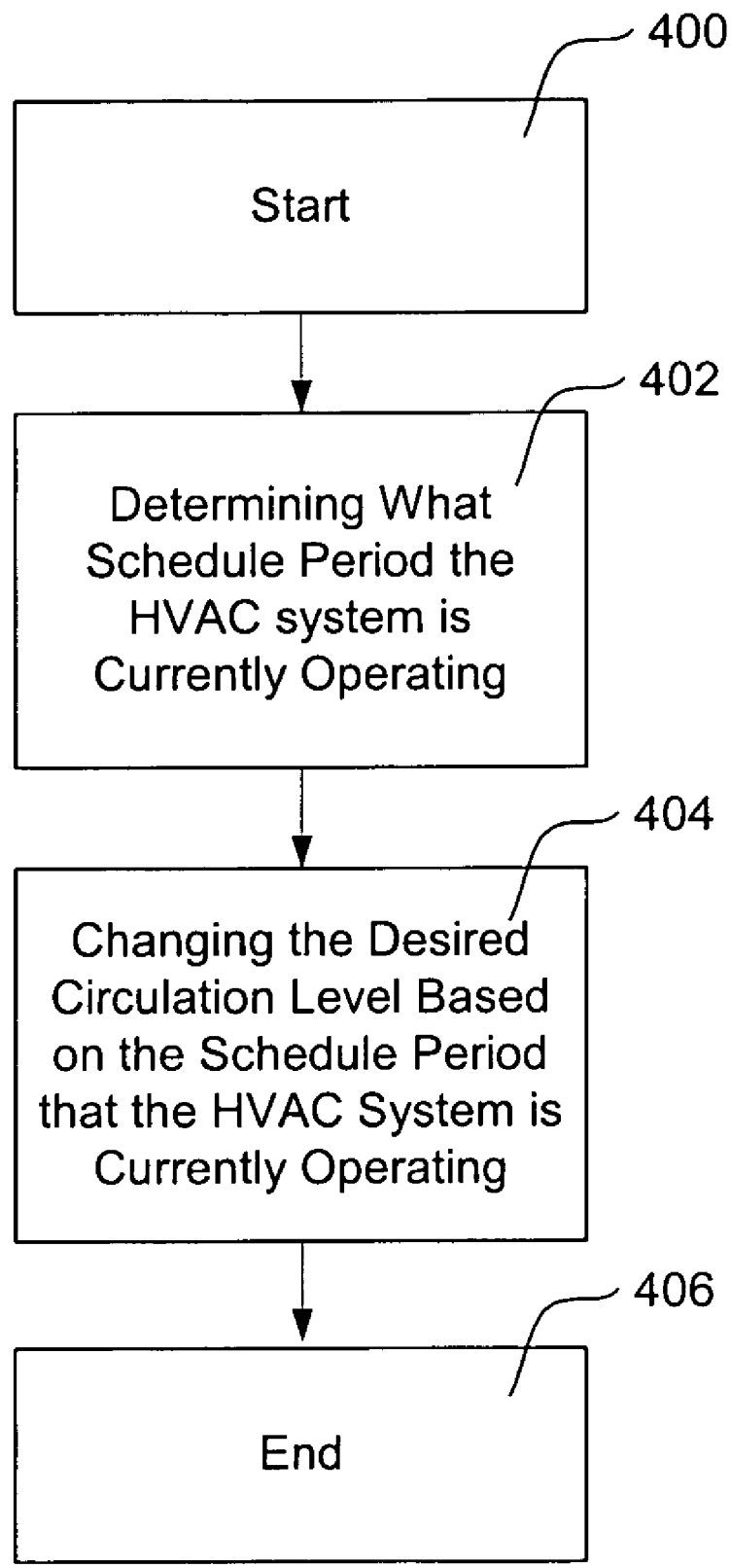
FIG. 4 shows a flow chart of another illustrative method in accordance with the present invention.

FIG. 4 shows a flow chart of another illustrative method in accordance with the present invention. The flow chart is entered at start block 400. Control is then passed to block 402. Block 402 determines what schedule period the HVAC system is currently operating in. For example, and as shown in FIG. 2C above, the HVAC system may be operating in the "Leave" time period on Wednesday. Alternatively, or in addition, the schedule time period may correspond to a season, such as fall, winter, spring or summer. Once the current schedule period has been identified, control is then passed to step 404. Step 404 changes the desired circulation level based on the schedule period that the HVAC system is currently operating. For example, during the warmer afternoons of a summer day, the fan circulation amount (in some cases including ventilation) may be increased to increase the cooling effect often felt by occupants caused by moving air. Likewise, during the cooler nights of a winter day, the fan circulation amount (in some cases including ventilation) may be decreased to help reduce the cooling effect often felt by occupants caused by moving air.

In some cases, the schedule of the HVAC system controller may be used to determine if the building is expected to be occupied or unoccupied. For example, during a "Leave" period of a typical HVAC system schedule, the controller may determine that the inside space is expected to be unoccupied. During unoccupied periods, the fan circulation amount (in some cases including ventilation) may be reduced to save energy and/or reduce equipment wear.

These are just a few examples of adaptively controlling the circulation and/or ventilation time based on one or more schedule periods, and in some cases, one or more system settings of the HVAC system. Once the desired circulation level has been changed by block 404, the illustrative method may be exited, as shown at 406. In some cases, the method may be repeated constantly or periodically to control the circulation level within a building structure. It is contemplated that the illustrative method of FIG. 4 may be combined with the method of FIG. 3, if desired.

Figure 5:
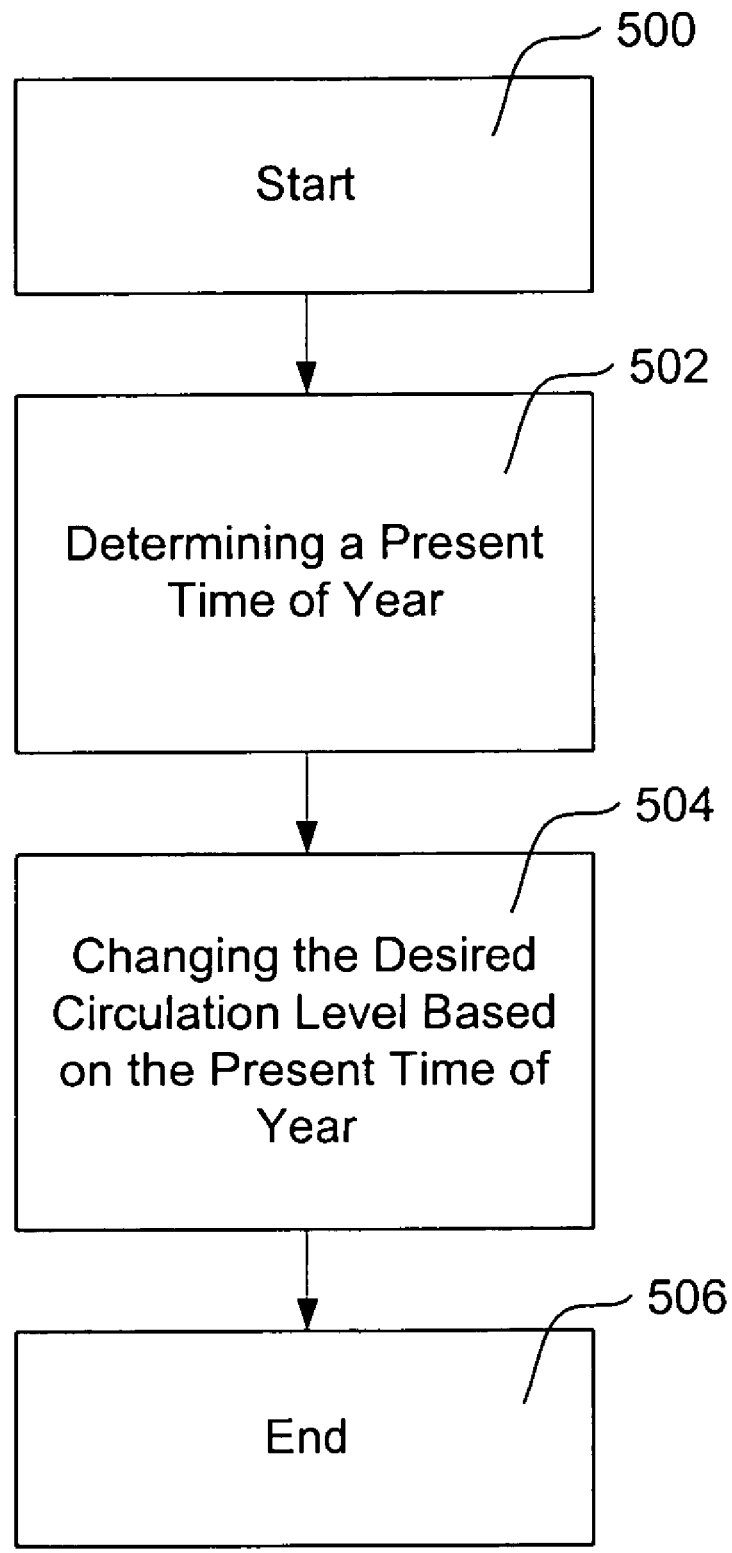
FIG. 5 shows a flow chart of another illustrative method in accordance with the present invention.

FIG. 5 shows a flow chart of another illustrative method in accordance with the present invention. The flow chart is entered at start block 500. Control is then passed to block 502. Block 502 determines a present time of year. For example, the present time of year may correspond to a season, such as fall, winter, spring or summer, a month or any other time of year, as desired. Once the present time of year has been identified, control is passed to step 504. Step

504 changes the desired circulation level based on the present time of year. For example, during the warmer summer season, the fan circulation amount (in some cases including ventilation) may be increased to increase the cooling effect often felt by occupants caused by moving air. Likewise, during the cooler winter season, the fan circulation amount (in some cases including ventilation) may be decreased to help reduce the cooling effect often felt by occupants caused by moving air.

These are just a few examples of adaptively controlling the circulation and/or ventilation time based on the present time of year, and in some cases, one or more system settings of the HVAC system. Once the desired circulation level has been changed by block 504, the illustrative method may be exited, as shown at 506. In some cases, the method may be repeated constantly or periodically to control the circulation level within a building structure. It is contemplated that the illustrative method of FIG. 5 may be combined with the methods of FIG. 3 and FIG. 4, if desired.

In another illustrative embodiment, the circulation (sometimes including ventilation) time may be randomized over time. For example, in some illustrative embodiments, the start time, the end time, and/or the length of the fan cycle (sometimes including ventilation) may be randomly set. This may provide a number of advantages including, for example, increased comfort, reduced power spiking in HVAC systems that have multiple equipment installations, etc.

Figure 6:
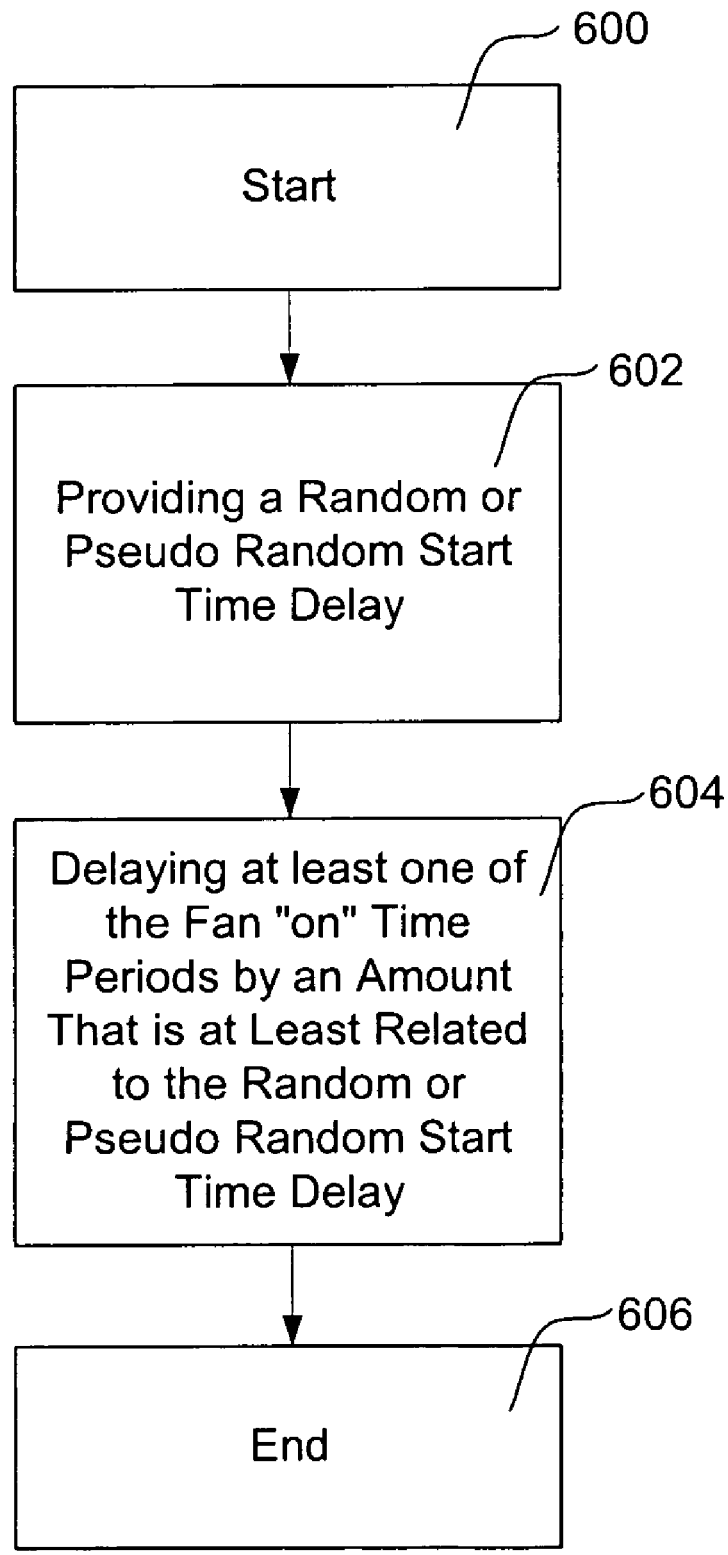
FIG. 6 is a flow chart of an illustrative method for randomizing the start time of a fan "on" cycle of an HVAC system in accordance with the present invention.

FIG. 6 is a flow chart of an illustrative method for randomizing the start time of a fan "on" cycle of an HVAC system in accordance with the present invention. The fan "on" cycle may be a circulation cycle, a heating cycle, a cooling cycle, or any other cycle where there has a fan "on" time and a fan "off" time. The flow chart is entered at start block 600. Control is then passed to block 602. Block 602 provides a random or pseudo random start time delay. The random or pseudo random start time delay may be generated by a random number generator. Alternatively, or in addition, the random or pseudo random start time delay may be selected from an ordered list of start time delays that very from one to the next, or by any other suitable method for generating an apparent random or pseudo random start time delay, as desired. Control is then passes to block 604. Block 604 delays at least one of the fan "on" time periods by an amount that is at least related to the random or pseudo random start time delay. The illustrative method may then be exited, as shown at 606. In some cases, the method shown in FIG. 6 may be repeated constantly or periodically to help randomize the fan "on" start times. In addition, the illustrative method of FIG. 6 may be combined with the methods of FIGS. 3–5, if desired.

Figure 7:
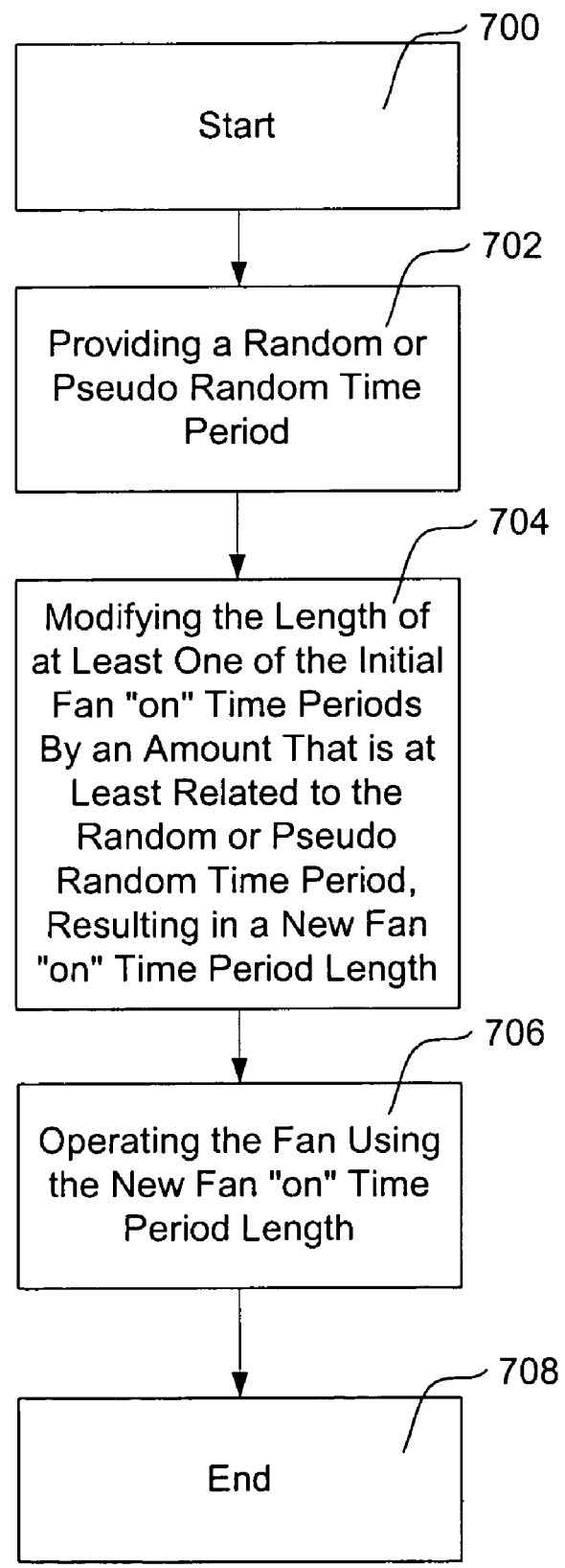
FIG. 7 is a flow chart of an illustrative method for randomizing the length of a fan "on" cycle of an HVAC system in accordance with the present invention.

FIG. 7 is a flow chart of an illustrative method for randomizing the length of a fan "on" cycle of an HVAC system in accordance with the present invention. The flow chart is entered at start block 700. Control is then passed to block 702. Block 702 provides a random or pseudo random time period. The random or pseudo random time period may be generated by a random number generator. Alternatively, or in addition, the random or pseudo random time period may be selected from an ordered list of time periods that very from one to the next, or by any other suitable method for generating an apparent random or pseudo random time period, as desired. Control is then passes to block 704. Block 704 modifies the length of at least one fan "on" time period by an amount that is at least related to the random or pseudo random time period, resulting in a new fan "on" time period length. Control is then passed to block 706. Block 706 operates the fan using the new fan "on" time period length. The illustrative method may then be exited, as shown at 708. In some cases, the method shown in FIG. 7 may be repeated constantly or periodically to help randomize the fan "on" time lengths. It is contemplated that the illustrative method of FIG. 7 may be combined with the methods of FIGS. 3–6, if desired.

Figure 8:
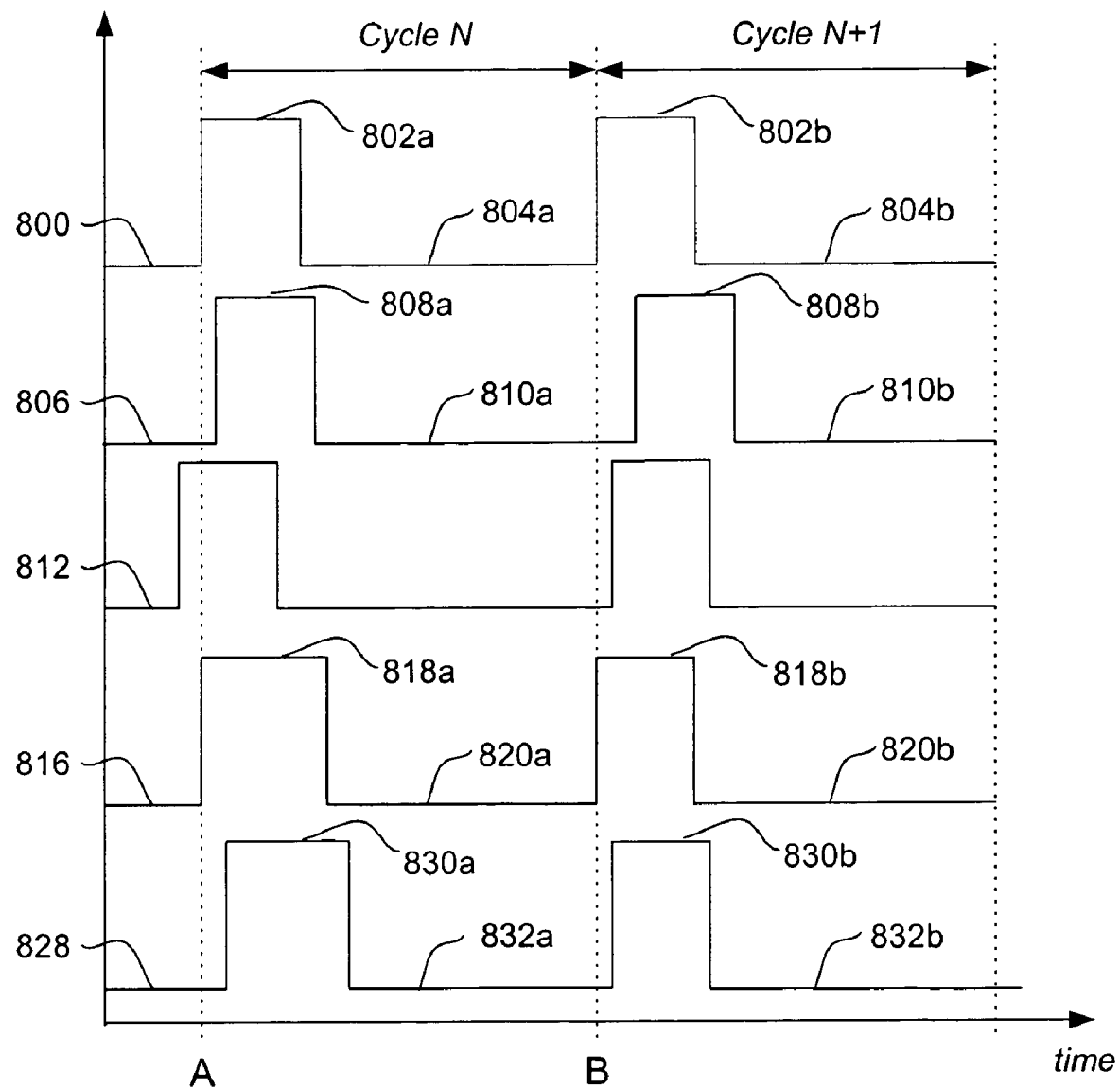
FIG. 8 is a timing diagram showing a number of illustrative fan cycles in accordance with the present invention.

FIG. 8 is a timing diagram showing a number of illustrative fan cycles in accordance with the present invention. A first line 800 illustrates standard fan cycles N and N+1. Fan cycle N begins at times A, and Fan cycle N+1 begins at time B. The fan cycle has a first fan "on" time 802a beginning at time A, followed by a first fan "off" time 804a, followed by a second fan "on" time 802b beginning at time B, followed by a second fan "off" time 804b. The first fan "on" time 802a and the second fan "on" time 802b both begin at the beginning of their respective fan cycles N and N+1, respectively, and have the same length.

A second line 806 shows a fan cycle that includes a randomized start time delay for each cycle N and N+1. The second line 806 shows a fan cycle that has a first fan "on" time 808a, followed by a first fan "off" time 810a, followed by a second fan "on" time 808b, followed by a second fan "off" time 810b. The start time of the first fan "on" time 808a is delayed from time A by a first random or pseudo random start time delay, and the start time of the second fan "on" time 808b is delayed from time B by a second random or pseudo random start time delay. For the second line 806, the length of the first fan "on" time 808a and the length of the second fan "on" time 808b are the same. A third line 812 shows that the random or pseudo random start time delays may be positive or negative, as desired.

A fourth line 816 shows a fan cycle that includes a randomized fan "on" time length for each cycle N and N+1. The fourth line 816 shows a fan cycle that has a first fan "on" time 818a beginning at time A, followed by a first fan "off" time 820a, followed by a second fan "on" time 818b beginning at time B, followed by a second fan "off" time 820b. There is no start time delay for the first fan "on" time 818a or the second fan "on" time 818b. However, the length of the first fan "on" time 818a and the second fan "on" time 818b have been randomly selected. Thus, in the illustrative embodiment, the length of the first fan "on" time 818a is longer than the length of the second fan "on" time 818b.

A fifth line 828 shows a fan cycle that includes a randomized start time delay and a randomized fan "on" time length for each cycle N and N+1. The fifth line 828 shows a fan cycle that has a first fan "on" time 830a, followed by a first fan "off" time 832a, followed by a second fan "on" time 830b, followed by a second fan "off" time 832b. The start time of the first fan "on" time 830a is delayed from time A by a first random or pseudo random start time delay, and the start time of the second fan "on" time 830b is delayed from time B by a second random or pseudo random start time delay. In addition, the length of the first fan "on" time 830a and the length of the second fan "on" time 830b are randomly selected or changed, and thus are shown having different lengths.

Figure 9A:
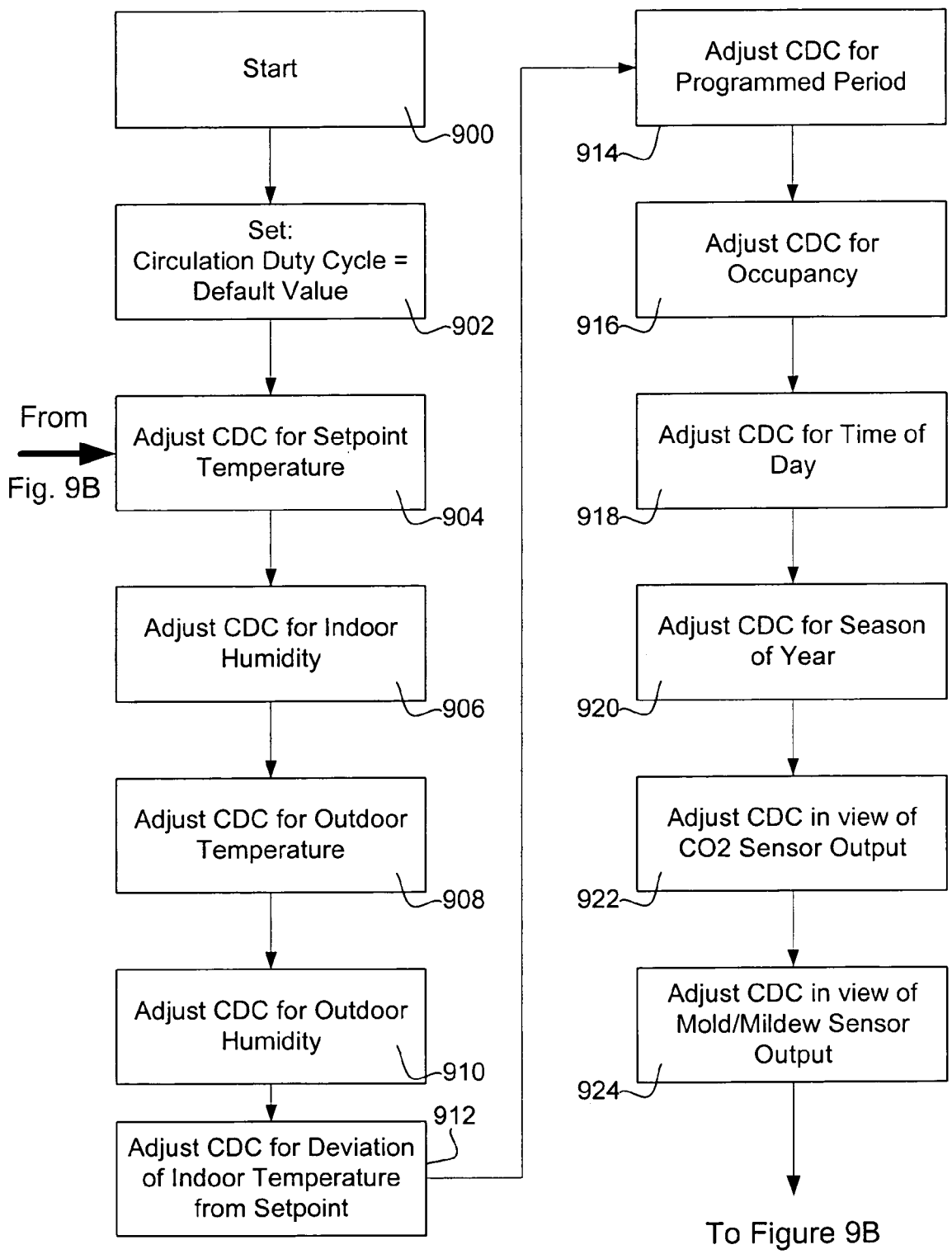
FIGS. 9A–9B show a flow chart in block form of another illustrative method in accordance with the present invention.
Figure 9B:
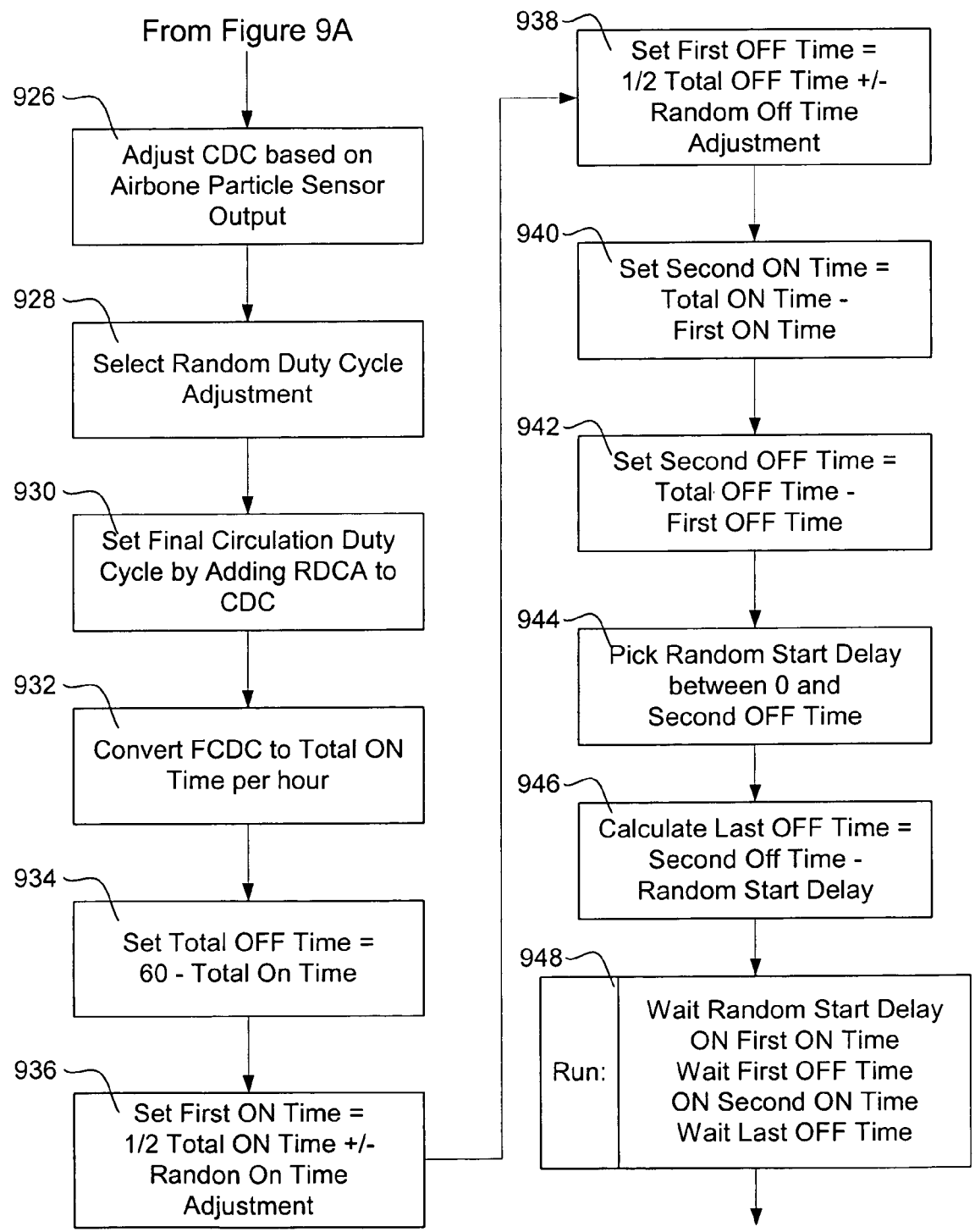

FIGS. 9A–9B show a flow chart in block form of another illustrative method in accordance with the present invention. From a start block 900, the method begins by setting a circulation duty cycle to a default value, as shown at 902. The circulation duty cycle may be a desired circulation duty cycle percentage or level. This may represent the amount or percentage of time during which the circulation fan of an HVAC system (typically a fan connected to ductwork) is on during a given time period. For purposes of simplicity, the present disclosure is presented in terms of hours, however this is not required in all embodiments. The circulation duty cycle can be a measure of time for a given time block, or it may be a percentage. For example, if the circulation duty cycle is fifty percent, the circulation (sometimes including ventilation) of an HVAC system may be turned on for thirty minutes in an hour. The default value may be provided to the HVAC controller via its factory settings, may be set by a technician during installation, or may be set by a user.

Next, and in the illustrative embodiment, the circulation duty cycle may be adjusted based on the current set point temperature, as shown at 904. The set point temperature may be an input provided by the user. For some HVAC controllers, a user is allowed to provide a schedule, wherein the set point may vary throughout a day and/or week. This may be relevant to the circulation duty cycle in that the desired circulation duty cycle can vary depending upon the set point temperature. For example, when the system is in a heating mode, and the set point is low, the equipment may operate less because the heating load is light. The ventilation circulation duty cycle may be reduced to avoid creating a cooling effect that may be felt by occupants caused by the movement of air. Alternatively, or in addition, when in a cooling mode, more air circulation may create a cooling effect, so the circulation duty cycle may be increased to improve the cooling effect caused by air movement. It should be noted that block 904 may be a return point for the method, since the illustrative method may loop back from FIG. 9B to the adjustment for set point temperature 904, as shown.

The illustrative method then may adjust the circulation duty cycle based on indoor humidity, as shown at block 906. For example, some systems include a humidifier that operates whenever the fan is "on". Thus, when in a heating mode and with a low indoor humidity level, the circulation duty cycle may be increased to encourage higher humidity by creating more air movement through the humidifier. In another example, the circulation duty cycle may be increased when in cooling mode to improve the cooling effect caused by air movement, particularly if a higher humidity is sensed.

Next the method may adjust the circulation duty cycle based on outdoor temperature, as shown at 908. For example, in a heating mode, and if the outdoor air temperature is high, the HVAC equipment may operate less to meet heating requirements, so the circulation duty cycle may be increased to improve air cleaning time that occurs as air is passed through a filter. In a cooling mode, the opposite may occur, with the circulation duty cycle increased if the outdoor temperature is low compared to the set point temperature.

The method then may adjust the circulation duty cycle for outdoor humidity as shown at 910. For example, when outdoor humidity is low and the system is in a heating mode, the circulation duty cycle (including ventilation) may be decreased to prevent drawing in the dry outdoor air. Alternatively, when the outdoor humidity is high and the system is operating in a cooling mode, the circulation duty cycle (including ventilation) can be decreased to help prevent drawing in wet outdoor air.

Next, the circulation duty cycle may be adjusted for deviations of indoor temperature from the set point temperature, as shown at 912. For example, when in a heating mode, if the indoor temperature is greater than the set point temperature, the circulation duty cycle may be increased to get more air cleaning time and to eliminate dead/stale air in the indoor space, as well as to de-stratify and equilibrate temperatures throughout the indoor space. Likewise, if in cooling mode, and the indoor air temperature drops below the set point temperature, the circulation duty cycle may be increased to help eliminate dead air, equilibrate the interior space, and improve air cleaning.

Next, the circulation duty cycle may be adjusted based on the programmed schedule period, as shown at 914. For example, a user may be given the option to increase or decrease ventilation during preprogrammed schedule periods, in much the same way that the user may be allowed to adjust the set point temperature based on a schedule. The circulation duty cycle may be changed, and/or the initial or default circulation duty cycles may be different, depending on the schedule period.

Next, the circulation duty cycle may be changed based on occupancy or expected occupancy, as shown at 916. When the space is unoccupied or expected to be occupied, the circulation duty cycle may be increased to provide increased comfort to the occupants. However, if the space is unoccupied, then the circulation duty cycle may be reduced to save energy and/or reduce wear on the equipment, particularly since there is no one in the space to notice whether air is circulated or not.

As shown at 918, the circulation duty cycle may then be adjusted based on time of day. For example, at night the circulation duty cycle may be reduced to avoid making noise while occupants are sleeping. In the morning, when occupants are taking showers and so forth, the circulation duty cycle may be increased to equilibrate humidity throughout the building and to clean the air after an evening of reduced circulation.

The circulation duty cycle may then be adjusted based on the time of year, as shown at 920. For example, during spring and fall, the circulation duty cycle may be increased to accomplish more cleaning of the air to remove pollen and other airborne particles that can cause allergic reactions.

Next, the circulation duty cycle may be adjusted based on the sensor output of a carbon dioxide, carbon monoxide or other gas or air quality sensor, as shown at 922. If the air quality sensor(s) indicates poor air quality, such as higher levels of $CO_2$, the circulation duty cycle (including ventilation) may be increased to bring in fresh air and reduce $CO_2$ levels.

As shown at 924, the circulation duty cycle may also be adjusted based on the output of a mold and/or mildew sensor. For example, given a particular level of sensed mold/mildew and/or spores, the circulation duty cycle (sometimes including ventilation) may be increased to eliminate stale air, clean spores out of the air, and to create equilibration that reduces the likelihood that conditions conducive to mold or mildew growth can occur.

Referring now to FIG. 9B, wherein the circulation duty cycle may be adjusted in response to an airborne particle sensor output, as shown at 926. If an airborne particle sensor indicates a higher amount of airborne particles, additional circulation may be provided to help clean the air using the HVAC filter. The above steps are merely illustrative methods for adjusting a circulation duty cycle, and may be performed in any suitable order. In addition, all of the steps just described need not be provided. Rather, any combination of the steps may be used, including none of the steps, as desired.

Having determined a circulation duty cycle, the method moves to selecting a random duty cycle adjustment as shown at 930. In the illustrative embodiment, the random duty cycle adjustment is used in conjunction with an HVAC circulation duty cycle that includes two half cycles per time period, such as per hour. Thus, the circulation duty cycle may include a first "on" time, a first "off" time, a second "on" time and a second "off" time during each hour.

In the illustrative embodiment, the random duty cycle adjustment is chosen to be within a five percent range of the total length of the time block used. For example, using a one-hour time block, a five percent range limit means that the random duty cycle adjustment must be plus or minus three minutes. Any value between negative three and positive three minutes may be used for the random duty cycle adjustment. Other limits or ranges may also be used, depending on the application.

The next step includes setting a final circulation duty cycle by adding the random duty cycle adjustment to the circulation duty cycle as adjusted above, as shown at 930. The final circulation duty cycle is then converted to a total ON time, as shown at 932, by converting a percentage to an amount of time based on the overall block of time. To do this, for example, if the final circulation duty cycle is 40%, then the total ON time for an hourly cycle would be 40% of sixty minutes, or twenty-four minutes.

The total OFF time is then calculated as shown at 934. The total OFF time is simply calculated by subtracting the total ON time from the length time that is used for the cycle. For example, if the cycle is performing on an hourly basis, then the total OFF time, in minutes, would be sixty minus the total ON time.

A first ON time is then calculated as shown at 936. First, a random ON time length adjustment is calculated and used in the setting of the first ON time, as shown at 936, by setting the first ON time to be one half of the total ON time plus or minus the random ON time length adjustment. For example, if a circulation duty cycle is set for twenty-four minutes in an hour, then two twelve minute cycles may be used. The random ON time length adjustment adjusts both of the twelve minute cycles so that they are unequal. For example, and when using a twenty-four minute circulation duty cycle, and a random ON time adjustment of two minutes is used, then the circulation time would meet the twenty four minute goal using a ten minute (twelve minus two) ON time cycle in combination with a fourteen minute (twelve plus two) ON time cycle.

A random OFF time adjustment is selected in the same way as the random ON time length adjustment, and used as shown at 938 to set a first OFF time as being one half of the total OFF time plus or minus the random OFF time length adjustment. The random OFF time length adjustment is used to modify the OFF times that are used. The second ON time is calculated as the total ON time minus the first ON time, as shown at 940. The second OFF time is calculated as the total OFF time minus the first OFF time, as shown at 942.

Next, a random start delay is chosen, as shown at 944. The random start delay may be used to determine how long the system will wait before initiating the first ON time after the start of a new time period. The limits on the random start delay, as noted at 944, are the second off time and zero. The last OFF time is then calculated as the second OFF time minus the random start delay, as shown at 946.

The system then runs according to the computed cycle as shown at 948. First, the system waits for the random start delay to expire. Then, the fan is activated for a period equal to the first ON time. The fan is then shut off and waits for expiration of the first OFF time. Next, the fan is activated for a period equal to the second ON time. Once the second ON time has expired, the method shuts off the fan until the last OFF time has expired, marking the start of a new time period. The method then returns to FIG. 9A, as noted at 904, where the circulation duty cycle is readjusted in light of environmental conditions and/or user preferences.

The methods illustrated herein may be incorporated in whole or in part into HVAC controllers and systems (such as those illustrated in FIGS. 1 and 2A–2C) in any suitable manner. Several embodiments incorporate such methods into readable media that is readable by one or more HVAC controllers and/or which are incorporated into or associated with an HVAC controller.

Those skilled in the art recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method of operating an HVAC system, wherein the HVAC system includes a fan that is operated with at least one fan "on" time period and at least one fan "off" time period, the method comprising the steps of:

providing a control signal path from an HVAC thermostat for activating and/or deactivating the fan, wherein the control signal path is not shared by other HVAC thermostats;

providing a random or pseudo random start time delay;

delaying at least one of the fan "on" time periods by an amount that is at least related to the random or pseudo random start time delay;

providing a random or pseudo random time period;

modifying the length of at least one of the fan "on" time periods by an amount that is at least related to the random or pseudo random time period, resulting in a new fan "on" time period length; and operating the fan using the new fan "on" time period length.

2. A controller for an HVAC system, wherein the HVAC system includes a fan and one or more air modifying devices, the controller comprising:

means for operating the fan in accordance with a fan duty cycle, wherein the fan duty cycle includes at least one fan "on" time period and at least one fan "off" time period;

means for generating a random or pseudo random fan start time delay;

means for delaying at least one of the fan "on" time periods by an amount that is at least related to the random or pseudo random fan start time delay;

means for activating at least one of the one or more air modifying devices without reference to the random or pseudo random fan start time delay;

means for providing a random or pseudo random time period;

means for modifying the length of at least one of the fan "on" time periods by an amount that is at least related to the random or pseudo random time period, resulting in a new fan "on" time period length; and means for operating the fan using the new fan "on" time period length.

3. A method of operating an HVAC system, wherein the HVAC system includes a fan that is operated at a duty cycle, wherein the duty cycle includes at least one fan "on" time period and at least one fan "off" time period, the method comprising the steps of:

providing a random or pseudo random start time delay; and delaying at least one of the fan "on" time periods by an amount that is at least related to the random or pseudo random start time delay;

providing a random or pseudo random time period;

modifying the length of at least one of the fan "on" time periods by an amount that is at least related to the random or pseudo random time period, resulting in a new fan "on" time period length; and operating the fan using the new fan "on" time period length.

4. A controller for an HVAC system, wherein the HVAC system includes a fan, the controller comprising:

means for operating the fan in accordance with a fan duty cycle, wherein the fan duty cycle includes at least one fan "on" time period and at least one fan "off" time period;

means for generating a random or pseudo random start time delay;

means for delaying at least one of the fan "on" time periods by an amount that is at least related to the random or pseudo random start time delay;

means for providing a random or pseudo random time period;

means for modifying the length of at least one of the fan "on" time periods by an amount that is at least related to the random or pseudo random time period, resulting in a new fan "on" time period length; and means for operating the fan using the new fan "on" time period length.

\* \* \* \* \*